3,048,595
SPIRO DERIVATIVES OF THIAXANTHENES AND XANTHENES

Charles L. Zirkle, Berwyn, Pa., assignor to Smith Kline & French Laboratories, Philadelphia, Pa., a corporation of Pennsylvania
No Drawing. Filed Nov. 14, 1960, Ser. No. 68,625
9 Claims. (Cl. 260—293.4)

This invention relates to novel spiro derivatives of thiaxanthenes and xanthenes having useful pharmacodynamic activity.

More specifically the compounds of this invention alter or modify the central nervous system and are useful as ataractic agents. In addition these compounds have antibacterial and antifungal properties, for example, they are active against *Diplococcus pneumoniae* and *Trichophyton mentagrophytes*.

The novel spiro derivatives of this invention are represented by the following structural formula:

Formula I

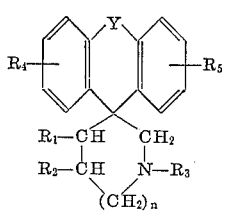

when:

Y represents sulfur or oxygen;
$R_1$ and $R_2$ represent hydrogen or lower alkyl;
$R_3$ represents hydrogen, lower alkyl or lower alkenyl;
$R_4$ and $R_5$ represent hydrogen, halogen having an atomic weight of less than 80 such as chloro, bromo or fluoro, trifluoromethyl, lower alkyl, lower alkoxy or lower alkylthio; and
$n$ represents the integers 0 or 1.

Advantageous compounds of this invention are represented by the following structural formula:

Formula II

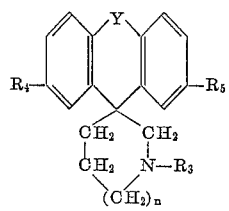

when:

Y represents sulfur or oxygen;
$R_3$ represents lower alkyl;
$R_4$ and $R_5$ represent hydrogen, chloro or trifluoromethyl; and
$n$ represents the integers 0 or 1.

By the terms "lower alkyl" and "lower alkoxy" where used herein alone or in combination with other terms, groups having from 1 to 4 carbon atoms, preferably 1, are indicated. The term "lower alkenyl" where used herein indicates groups having 3 to 4 carbon atoms.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition this invention includes pharmaceutically acceptable, nontoxic quaternary ammonium salts of the above defined bases formed with a reactive alkyl ester such as a halide, p-toluene sulfonate, benzene sulfonate or lower alkyl sulfonate.

The spiro compounds of this invention are prepared by the following procedure:

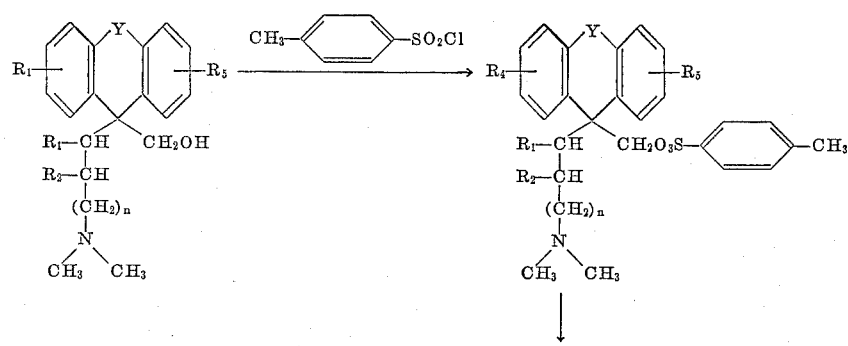

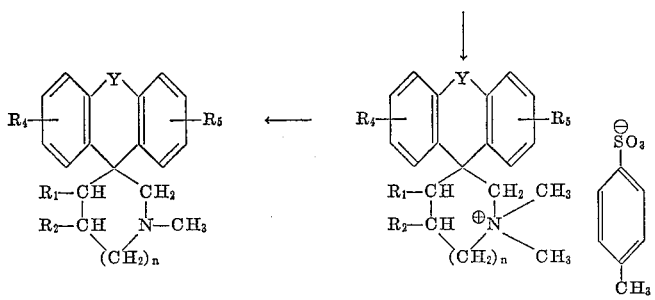

The terms Y, $R_{1-5}$ and $n$ are as previously defined.

The thiaxanthene or xanthene methanol starting material is reacted with about a molar equivalent amount of p-toluenesulphonyl chloride in the presence of an excess of an organic base such as pyridine, picoline, or lutidine. The reaction is conveniently carried out at room temperature for a period of about 24–72 hours to give the 10-thiaxanthenemethyl p-toluenesulfonate or the corresponding 9-xanthenemethyl ester. Cyclization of this intermediate ester in certain cases occurs spontaneously. In other instances the intermediate ester is heated at about 75–100° C. in an inert organic solvent such as methyl ethyl ketone, benzene or toluene to separate the pyrrolidinium or piperidinium p-toluenesulfonate salt. This quaternary salt is converted to the quaternary halide by passing an alcoholic solution of the p-toluenesulfonate through the halide form of an ion exchange resin. Exemplary of the resins (halide form) which can be used are the preferred Amberlite IRA–400, as well as Amberlite IRA–401, Amberlite IRA–410, Amberlite IRA–411, Dowex 1, Dowex 2, Imac S–3 and others. Full descriptions of these resins including what is known of their sources and chemical characteristics are found in "Ion Exchange Resins," by Kunin, 2nd Edition, John Wiley, pages 89–96, and "Ion Exchanges in Organic and Biochemistry," by Calmon and Kressman, Interscience, pages 116–129. Exemplary of the preparation of anion exchange resins used are those disclosed by U.S. Patents No. 2,591,573, No. 2,591,574, No. 2,689,833, No. 2,689,832 and No. 2,725,361, particularly, those of the example of No. 2,591,573.

Heating the quaternary halide salt results in decomposition to give the spirothiaxanthenes and xanthenes of Formula I in which $R_3$ is methyl.

The compounds of Formula I in which $R_3$ is hydrogen, lower alkyl other than methyl or lower alkenyl are advantageously prepared by converting diallylaminoalkyl-thiaxanthene or -xanthene methanol to the N-allyl compound of Formula I, treating said N-allyl compound with cyanogen bromide and hydrolyzing the resulting N-cyano compound with acid or base to give the N-unsubstituted compound.

N-alkylation is accomplished by refluxing the N-unsubstituted compound with at least one equivalent of the appropriate acid halide or anhydride and subsequent reduction of the resulting acyl compound with a bimetallic hydride such as lithium aluminum hydride. The N-alkenylation and, alternatively, the N-alkylation is carried out by refluxing the N-unsubstituted compound with at least one equivalent of a reactive alkenyl or alkyl ester such as the sulfonate or chloride in an inert solvent such as benzene or toluene. The reaction is preferably carried out in the presence of an acid binding agent such as an alkali metal carbonate or amide, for example, potassium carbonate or sodium amide.

The thiaxanthene and xanthene methanol starting materials are prepared as described in detail in my co-pending application, Serial No. 825,670, filed on July 8, 1959. Briefly these starting materials are prepared by reducing thiaxanthenones or xanthenones, treating the resulting thiaxanthene or xanthene with butyl lithium and carbon dioxide, esterifying the resulting 10-thiaxanthene or 9-xanthene carboxylic acid, alkylating this ester by treating with sodium or potassium and an aminoalkyl halide and reducing the ester moiety to a methanol moiety with lithium aluminum hydride to give the desired starting material. The thiaxanthenones and xanthenones of the above process are either known to the art or may be prepared in a variety of ways such as:

(1) A thiosalicylic acid may be treated with benzene and concentrated sulfuric acid.

(2) Reaction of a sodium or potassium phenolate or thiphenolate with an o-chlorobenzoic acid and cyclization of the resulting 2-aryloxy-(or thio)benzoic acid by heating, advantageously in the presence of an acidic reagent.

It will be readily apparent to one skilled in the art that certain compounds of this invention notably those in which either or both of $R_1$ and $R_2$ are lower alkyl may be present as optical isomers. The connotation of the general formulas presented herein is to include all isomers, the separated d or l optical isomers as well as the dl mixture of these isomers.

The following examples are not limiting but are illustrative of compounds of this invention and the procedures for their preparation and will serve to make fully apparent all of the compounds embraced by the general formula given above.

*Example 1*

Potassium (16.0 g.) is added slowly to a solution of 110.0 g. of ethyl 10-thiaxanthene carboxylate in 1700 ml. of dry toluene. The resulting mixture is stirred for two hours, then slowly heated to reflux. To the cooled mixture is added 59.5 g. of 3-chloro-1-dimethylaminopropane in 200 ml. of toluene. The mixture is refluxed for 24 hours and treated with 100 ml. of ethanol. The toluene layer is extracted with dilute hydrochloric acid, the acid extracts are neutralized with sodium carbonate and extracted with chloroform. The chloroform extracts are dried, evaporated and distilled to give ethyl 10-(3'-dimethylaminopropyl) - 10 - thiaxanthenecarboxylate, B.P. 194–198° C. (0.1–0.2 mm.).

A solution of 97.1 g. of the above prepared carboxylate in 250 ml. of ether is added slowly to 7.8 g. of lithium aluminum hydride in 600 ml. of dry ether. The resulting mixture is refluxed for 6.5 hours, then treated with ethyl acetate-ether and 17.6 ml. of water. This mixture is stirred for three hours at room temperature and filtered. The filtrate is dried over anhydrous potassium carbonate, concentrated and treated with an excess of maleic acid. Filtration of the solid material and recrystallization from ethanol-ether gives 10 - (3' - dimethylaminopropyl)-10-thiaxanthene methanol maleate, M.P. 143.5–145° C.

An ethanol solution of the above prepared salt is neutralized with sodium hydroxide solution, extracted with ether and the ether extract evaporated to give, as the residue, the free base.

A solution of 24.7 g. of 10-(3'-dimethylaminopropyl)-10-thiaxanthene methanol, 15.1 g. of p-toluenesulfonyl chloride and 48 ml. of dry pyridine is allowed to stand for 48 hours at room temperature. The solvent is removed in vacuo using steam. The mixture is made slightly basic and extracted with ether. The ether is removed from the extract and the residue is refluxed for 12 hours in methyl ethyl ketone. The 1,1-dimethyl-spiro[piperidinium-3,10'-thiaxanthene]p-toluenesulfonate is isolated by filtration. A methanolic solution of this salt is passed through an ion exchange resin (chloride form, IRA 400, Rohm & Haas) to give the corresponding chloride salt which is recrystallized from acetonitrile to give M.P. 225–227° C.

Ten grams of 1,1-dimethyl-spiro[piperidinium-3,10'-thiaxanthene]chloride is heated in a sausage flask at 0.25–0.5 mm. to decompose the salt to give 1-methyl-spiro[piperidine-3,10'-thiaxanthene] which is distilled, B.P. 152–5° C. (about 0.5 mm.).

An ethanol solution of the free base is treated with excess maleic acid. Dilution with ether, filtration and recrystallization from ethanol-ether gives the maleate salt, M.P. 183–4° C.

*Example 2*

To a solution of 70.0 g. of ethyl 10-thiaxanthenecarboxylate in 1200 ml. of dry toluene is added 10.0 g. of potassium. The mixture is stirred at room temperature for two hours, then refluxed for 15 minutes. 2-chloro-1-dimethylaminoethane (89.5 g.) is added and the resulting mixture is refluxed for 24 hours, then treated wiht 200 ml. of t-butanol and stirred for one hour. Ethanol (50 ml.) is added. The toluene layer is extracted with dilute hydrochloric acid; the aqueous layer is made basic and extracted with chloroform. Evaporation and distillation of the chloroform extracts gives ethyl 10-(2'-dimethylaminoethyl)-10-thiaxanthenecarboxylate, B.P. 182–189° C. (.1–12 mm.).

A solution of 110.0 g. of this carboxylate in 300 ml. of ether is added slowly to 9.26 g. of lithium aluminum hydride in 700 ml. of ether and the resulting mixture is refluxed for 6.5 hours. Working up as in Example 1 gives 10-(2'-dimethylaminoethyl)-10-thiaxanthene methanol.

A solution of 23.8 g. of 10-(2'-dimethylaminoethyl)-10-thiaxanthene methanol, 15.0 g. of p-toluenesulfonyl chloride and 50 ml. of dry pyridine is allowed to stand at room temperature for 48 hours. The mixture is concentrated in vacuo, made slightly basic and washed with ether. The mixture is made strongly basic and extracted with chloroform. The chloroform extract is dried over potassium carbonate and concentrated in vacuo to leave the crude p-toluenesulfonate salt. Passage of a methanolic solution of this salt throught an ion exchange resin as in Example 1 gives 1,1-dimethyl-spiro-[pyrrolidinium-3,10'-thiaxanthene]chloride.

Heating this chloride salt at 0.25–0.4 mm. gives 1-methyl-spiro[pyrrolidine-3,10'-thiaxanthene].

An ethanol solution of the free base is treated with excess maleic acid, then diluted with water to give 1-methyl-spiro[pyrrolidine-3,10'-thiaxanthene]maleate.

*Example 3*

A mixture of 188 g. of 5-chloro-2-mercapto-benzoic acid, 600 ml. of dry benzene and 1800 ml. of concentrated sulfuric acid is refluxed for five minutes, then stirred at room temperature for 24 hours. The mixture is poured into ice and the precipitate which forms is filtered, washed with water, with dilute ammonium hydroxide and with ethanol to give 2-chloro-10-thiaxanthenone.

The above prepared 2-chloro-10-thiaxanthenone (75.0 g.) is dissolved in 1500 ml. of refluxing isoamyl alcohol. Sodium (50.0 g.) is added slowly and the resulting mixture is refluxed for 30 minutes. The excess alcohol is steam distilled and the residue is cooled, treated with cold water and filtered to give crystalline 2-chlorothiaxanthene.

Butyl bromide (80.0 g.) in 150 ml. of ether is added to 10.0 g. of lithium in 600 ml. of ether at −10° C. and the mixture is slowly warmed to +5° C. Fifty grams of 2-chlorothiaxanthene is added and the resulting mixture is refluxed for one hour, then cooled in Dry Ice and added, under nitrogen, to 1500 ml. of ether saturated with carbon dioxide in a Dry Ice-alcohol bath (−50° C.). The mixture is stirred in the Dry Ice bath for two hours, then filtered. The filtrate is treated with ethanol, then water and filtered. The aqueous layer is acidified and filtered to give 2-chloro-10-thiaxanthenecarboxylic acid as a white solid. This carboxylic acid is esterified by refluxing in excess ethanol containing hydrogen chloride, then concentrating the solution, adding ether, washing with water and sodium bicarbonate solution and distilling to give ethyl 2-chloro-10-thiaxanthenecarboxylate.

The above prepared carboxylate in toluene solution is treated with potassium and then with an excess of 3-chloro-1-dimethylaminopropane. Refluxing the mixture for 24 hours and working up as in Example 1 gives 2-chloro - 10 - (3' - dimethylaminopropyl) - 10 - thiaxanthenecarboxylate.

Reduction of ethyl 2-chloro-10-(3'-dimethylaminopropyl)-10-thiaxanthenecarboxylate with lithium aluminum hydride in ether solution as in Example 1 gives 2-chloro-10-(3'-dimethylaminopropyl)-10-thiaxanthene methanol.

A solution of 17.3 g. of 2-chloro-10-(3'-dimethylaminopropyl)-10-thiaxanthene methanol, 9.5 g. of p-toluenesulfonyl chloride and 35 ml. of pyridine is allowed to stand for 36 hours. Working up as in Example 1 and refluxing the intermediate 2-chloro-10-(3'-dimethylaminopropyl)-10-thiaxanthenemethyl p-toluenesulfonate in methyl ethyl ketone for 10 hours gives 2'-chloro-1,1-dimethyl-spiro[piperidinium - 3,10' - thiaxanthene] p-toluenesulfonate. This salt is converted to the chloride by passing it in methanol solution through an ion exchange resin (chlordie form of IRA 400). Heating the quaternary chloride at 0.5 mm. and distilling the product gives 2'-chloro-1-methyl-spiro[piperidine-3,10'-thiaxanthene].

The free base in ethanol solution is treated with excess ethereal hydrogen chloride to give the hydrochloride salt.

*Example 4*

A solution of 50.8 g. of ethyl 9-xanthenecarboxylate in 500 ml. of dry toluene is treated with 7.8 g. of potassium. The resulting mixture is stirred at room temperature for two hours, then refluxed for ten minutes. To this mixture is added 32.0 g. of 2-chloro-1-dimethylaminoethane and the resulting solution is refluxed for 24 hours. Ethanol (200 ml.) is added to the cooled mixture. The toluene layer is extracted with dilute hydrochloric acid. The aqueous extracts are made basic and extracted with chloroform. The chloroform extracts are evaporated and distilled to give ethyl 9-(2'-dimethylaminoethyl)-9-xanthenecarboxylate.

An ether solution of the above prepared carboxylate (33.9 g. in 150 ml. of ether) is added slowly to 3.0 g. of lithium aluminum hydride in 100 ml. of ether. The mixture is refluxed for seven hours and worked up as in Example 1 to give 9-(2'-dimethylaminoethyl)9-xanthene methanol.

A mixture of 14.1 g. of 9-(2'-dimethylaminoethyl)-9-xanthene methanol, 9.5 g. of p-toluenesulfonyl chloride and 50 ml. of pyridine is allowed to stand at room temperature for 48 hours. Working up as in Example 2 gives 1,1 - dimethyl - spiro[pyrrolidinium - 3,9' - xanthene]-p-toluenesulfonate. The chloride salt is prepared by passing a methanolic solution of the p-toluenesulfonate through an ion exchange resin.

The quaternary chloride is heated at 0.5 mm. and the product is distilled to give 1-methyl-spiro[pyrrolidine-3,9'-xanthene].

*Example 5*

Potassium (4.0 g.) is added to a solution of 27.5 g. of ethyl 10-thiaxanthene carboxylate in 400 ml. of dry toluene and the mixture is stirred for 90 minutes at room temperature, then refluxed for ten minutes. Twenty grams of 1-chloro-3-dimethylamino-1-methyl propane is added and the mixture is refluxed for 24 hours. Ethanol is added; the toluene layer is separated and extracted with dilute hydrochloric acid. The acid extracts are made basic with sodium carbonate and extracted with chloroform. Evaporation of the chloroform from the extracts and distillation of the residue gives ethyl 10-(β'-dimethylamino-1'-methylpropyl)-10 - thiaxanthenecarboxylate.

A solution of 37.0 g. of the above prepared carboxylate in 100 ml. of ether is added to 3.0 g. of lithium aluminum hydride in 300 ml. of ether. The mixture is refluxed for six hours and worked up as in Example 1 to give 10-(3'-dimethylamino-1'-methylpropyl)-10-thiaxanthene methanol.

A mixture of 16.3 g. of 10-(3'-dimethylamino-1'-methylpropyl)-10-thiaxanthene methanol, 9.5 g. of p-toluenesulfonyl chloride and 35 ml. of dry pyridine is allowed to stand at room temperature for 48 hours. Working up as in Example 1 and refluxing the intermediate 10-(3'-dimethylamino-1'-methylpropyl)-10-thiaxanthenemethyl-p-toluenesulfonate in methyl ethyl ketone for 16 hours gives 1,1,4-trimethyl-spiro[piperidinium-3,10'-thiaxanthene]p-toluenesulfonate. A methanolic solution of this salt is passed through an ion exchange resin (chloride form of IRA 400) to give the corresponding quaternary chloride which is heated at 0.5 mm. and distilled to give 1,4-dimethyl-spiro[piperidine-3,10'-thiaxanthene].

The free base in alcohol solution is treated with an excess of hydrogen bromide in ether to give the hydrobromide salt.

*Example 6*

Condensation of ethyl 9-xanthenecarboxylate with 1-chloro-3-dimethylamino-2-methyl propane and reduction of the resulting intermediate with lithium aluminum hydride gives 9-(3'-dimethylamino-2'-methylpropyl)-9-xanthene methanol.

A mixture of 15.6 g. of 9-(3'-dimethylamino-2'-methylpropyl)-9-xanthene methanol, 9.5 g. of p-toluenesulfonyl chloride and 40 ml. of dry pyridine is kept at about 25° C. for 48 hours. Working up as in Example 1 and refluxing the intermediate ester in methyl ethyl ketone gives 1,1,5-trimethylspiro[piperidinium-3,9'-xanthene]p - toluenesulfonate which is passed through a chloride exchange column to give the corresponding chloride salt.

Five grams of 1,1,5-trimethyl-spiro[piperidinium-3,9'-xanthene]chloride is heated in a sausage flask at 0.25–0.5 mm. and the resulting product is distilled to give 1,5-dimethyl-spiro[piperidine-3,9'-xanthene].

The free base (1.0 g.) in 20 ml. of ethanol is treated with an excess of maleic acid. Diluting with ether and filtering gives the maleate salt.

*Example 7*

A mixture of 16.4 g. of 2-methoxy-10-(2'-dimethylaminoethyl)-10-thiaxanthene methanol (prepared as in Example 3 from 2-methoxy-10-thiaxanthenone), 9.5 g. of p-toluenesulfonyl chloride and 35 ml. of lutidine is allowed to stand at room temperature for 60 hours. Working up as in Example 2 gives 2'-methoxy-1,1-dimethyl-spiro[pyrrolidinium-3,10'-thiaxanthene]-p-toluenesulfonate. This salt is taken up in methanol and passed through a chloride exchange resin to give the corresponding chloride salt which is heated at about 0.4–0.5 mm. The resulting product is distilled to give 2'-methoxy-1-methyl-spiro[pyrrolidine-3,10'-thiaxanthene].

*Example 8*

A solution of 33.2 g. of ethyl salicylate in 200 ml. of aqueous ethanol containing 8.0 g. of sodium hydroxide is treated with 45.0 g. of 1-chloro-2-nitro-4-trifluoromethylbenzene. The resulting mixture is refluxed for 30 minutes, diluted with water and acidified with dilute hydrochloric acid. Filtration of the precipitate gives o-(2'-nitro-4'-trifluoromethylphenoxy)benzoic acid.

The above prepared nitro compound is added to a solution of 150 g. of stannous chloride dihydrate in 150 ml. of concentrated hydrochloric acid. The mixture is warmed on the steam bath at 85–90° C. for three hours, then poured into a cold solution of 200 g. of sodium hydroxide in 400 ml. of water. The precipitated product, o-(2'-amino-4'-trifluoromethylphenoxy)benzoic acid, is filtered off and washed with water.

A solution of 29.7 g. of o-(2'-amino-4'-trifluoromethylphenoxy)benzoic acid, 50 ml. of hydrochloric acid and 60 ml. of water is cooled to 10° C. and diazotized by the addition of 7.5 g. of sodium nitrite at 10° C. Cold 50% aqueous hypophosphorous acid (70.0 g.) is added and the reaction mixture is kept at 0°–5° C. for 24 hours. Addition of 40% sodium hydroxide until the mixture is basic and filtration of the precipitate gives o-(4'-trifluoromethylphenoxy)benzoic acid. Heating this compound for 20 minutes with 20 ml. of concentrated sulfuric acid on the steam bath, cooling, pouring into water and collecting the precipitate gives 2-trifluoromethyl-9-xanthenone.

Reduction of this xanthenone by refluxing with isoamyl alcohol and sodium yields the corresponding xanthene, which is added to an ether solution of butyl lithium and refluxed for one hour. The mixture is cooled in Dry Ice and added, under nitrogen, to ether saturated with carbon dioxide at —50° C. Working up as in Example 3 gives 2-trifluoromethyl-9-xanthene carboxylic acid. Esterifying by refluxing in excess ethanol containing hydrogen chloride, and condensing with 3-chloro-1-dimethylaminopropane by refluxing in toluene solution gives ethyl-2 - trifluoromethyl-9-(3' - dimethylaminopropyl) - 9-xanthenecarboxylate.

An ether solution of 20.3 g. of the above prepared carboxylate is added slowly to 2.0 g. of lithium aluminum hydride in 100 ml. of dry ether. The mixture is refluxed for 6.5 hours, then treated with ethyl acetate-ether, heated to reflux, diluted with water, filtered and evaporated to give 2-trifluoromethyl-9-(3'-dimethylaminopropyl)-9-xanthene methanol.

A mixture of 18.2 g. of the above prepared compound, 9.5 g. of p-toluenesulfonyl chloride and 45 ml. of dry pyridine is kept at room temperature for 48 hours. Working up as in Example 1 and refluxing the intermediate ester in methyl ethyl ketone gives 2'-trifluoromethyl-1,1-dimethyl - spiro[piperidinium - 3,9' - xanthene]p - toluenesulfonate. Passing a methanol solution of this salt through an ion exchange resin (chloride form of IRA 400) yields the chloride salt which is then heated at 0.25–0.5 mm. The product is 2'-trifluoromethyl-1-methyl-spiro[piperidine-3,9'-xanthene].

An ethanolic solution of the free base is treated with excess hydrogen chloride in ether to give the hydrochloride salt.

*Example 9*

A mixture of 18.4 g. of 2-trifluoromethyl-10-(2'-dimethylaminoethyl)-10-thiaxanthene methanol, prepared as in Example 8 from thiosalicylic acid and 1-chloro-2-nitro-4-trifluoromethylbenzene, 9.5 g. of p-toluenesulfonyl chloride and 40 ml. of dry pyridine is held at room temperature for 48 hours. Working up as in Example 2 gives 2'-trifluoromethyl - 1,1 - dimethyl - spiro - [pyrrolidinium-3,10'-thiaxanthene]p-toluenesulfonate. Passing a methanolic solution of this quaternary ammonium p-toluenesulfonate through an ion exchange resin as in Example 1 gives the corresponding quaternary ammonium chloride.

Heating the above prepared quaternary ammonium chloride in vacuo and distilling the product gives 2'-trifluoromethyl - 1 - methyl-spiro[pyrrolidine-3,10'-thiaxanthene].

An ethyl acetate solution of the free base is treated with an equivalent amount of citric acid to give, upon concentration and coooling, the citrate salt.

*Example 10*

A mixture of 14.8 g. of 3-methyl-9-(2'-diethylaminoethyl)-9-xanthene methanol, prepared as in Example 3 from 3-methylxanthene, 9.5 g. of p-toluenesulfonyl chloride and 35 ml. of dry pyridine is allowed to stand for 48 hours, then worked up as in Example 2 to give 1,1,3'-trimethyl-spiro[pryrolidinium - 3,9' - xanthene]p-toluenesulfonate. A methanolic solution of this quaternary salt is passed through an ion exchange resin to give 1,1,3'-trimethyl-spiro[pyrrolidinium-3,9'-xanthene]chloride.

Heating this chloride salt in vacuo and distilling the product gives 1,3′-dimethyl-spiro[pyrrolidine-3,9′-xanthene].

Example 11

2-chloro - 8 - methyl-10-(3′-dimethylaminopropyl)-10-thiaxanthene methanol is prepared as in Example 3 from 2-chloro-8-methyl-10-thiaxanthenone.

A mixture of 18.1 g. of 2-chloro-8-methyl-10-(3′-dimethylaminopropyl)-10-thiaxanthene, 9.5 g. of p-toluenesulfonyl chloride and 45 ml. of dry pyridine is allowed to stand for 36 hours to give, after working up as in Example 1 and refluxing the intermediate ester with methyl ethyl ketone, 2′-chloro-1,1,8′-trimethyl-spiro[piperidinium-3,10′-thiaxanthene]p-toluenesulfonate. A methanolic solution of this quaternary salt is passed through the chloride form of IRA 400 to give the corresponding chloride salt.

Ten grams of 2′-chloro-1,1,8′-trimethyl-spiro[piperidinium-3,10′-thiaxanthene]chloride is heated at 0.25–0.5 mm. The resulting product is distilled to give 2′-chloro-1,8′-dimethyl-spiro[piperidine-3,10′-thiaxanthene].

An ethanol solution of the free base is treated with an excess of ethereal hydrogen chloride to yield the hydrochloride salt.

Example 12

A mixture of 9.1 g. of 2,7-dichloro-9-(3′-dimethylaminopropyl)-9-xanthene methanol, prepared as in Example 3 from 2,7-dichloro-9-xanthenone, 4.8 g. of p-toluenesulfonyl chloride and 30 ml. of dry pyridine is kept at room temperature for 48 hours to give, after treating as in Example 1, 2′-7′-dichloro-1,1-dimethyl-spiro[piperidinium-3,9′-xanthene]p-toluenesulfonate. This salt is dissolved in methanol and passed through an ion exchange resin (chloride form of IRA 400) to give 2′,7′-dichloro-1,1-dimethyl-spiro[piperidinium-3,9′-xanthene]chloride.

Heating the above prepared quaternary ammonium chloride in vacuo and then distilling the resulting product gives 2′,7′ - dichloro - 1 - methyl - spiro[piperidine - 3,9′-xanthene].

Example 13

A mixture of 18.8 g. of 1-bromo-9-(3′-dimethylaminopropyl)-9-xanthene methanol, prepared as in Example 3 from 1-bromo-9-xanthenone, 9.5 g. of p-toluenesulfonyl chloride and 40 ml. of dry pyridine is allowed to stand at room temperature for 48 hours. Working up as in Example 1 gives 1′-bromo - 1,1 - dimethyl-spiro[piperidinium-3,9′-xanthene]p-toluenesulfonate which is passed through an ion exchange resin to give the corresponding chloride.

Heating 1′-bromo-1,1-dimethyl-spiro[piperidinium-3,9′-xanthene]chloride in vacuo and distilling the product gives 1′-bromo-1-methyl-spiro[piperidine-3,9′-xanthene].

Example 14

Heating a mixture of o-chlorobenzoic acid, sodium p-methylthiophenolate and copper powder for one hour at 150° C., extracting with ether, washing with dilute sodium hydroxide, saponifying the ester with potassium hydroxide and cyclizing by heating for five minutes with concentrated hydrochloric acid, making the solution alkaline with ammonium hydroxide and filtering the product gives 2-methylthio-9-xanthenone. Reduction by refluxing in isoamyl alcohol containing sodium, carboxylation by treatment with butyl lithium and carbon dioxide in ether solution and esterification gives ethyl 2-methylthio-9-xanthenecarboxylate.

The above prepared carboxylate is treated with potassium and with 3-chloro-1-dimethylaminopropane in toluene solution to give ethyl 2-methylthio-9-(3′-dimethylaminopropyl)-9-xanthenecarboxylate. This carboxylate (20.0 g.) in 100 ml. of ether is added to 1.9 g. of lithium aluminum hydride in 200 ml. of ether. Refluxing for seven hours, treating with ethyl acetate-ether, heating to reflux, adding water, filtering and concentrating gives 2-methylthio - 9 - (3′ - dimethylaminopropyl)-9-xanthene methanol.

A mixture of 17.1 g. of 2-methylthio-9-(3′-dimethylaminopropyl)-9-xanthene methanol, 9.5 g. of p-toluenesulfonyl chloride and 50 ml. of dry lutidine is allowed to stand at room temperature for 48 hours and then is treated as in Example 1 to give 1,1-dimethyl-2′-methylthio - spiro[piperidinium - 3,9′ - xanthene]p - toluenesulfonate. A methanolic solution of this salt is passed through an ion exchange resin and the resulting quaternary ammonium chloride is heated in vacuo to give 1-methyl-2′-methylthio-spiro[piperidine-3,9′-xanthene].

The free base (0.5 g.) in 50 ml. of ether is treated with an equal molar amount of glacial acetic acid to give the acetate salt upon evaporation of the solvent.

Example 15

Potassium (0.5 g.) is added to a solution of 35.0 g. of ethyl 10-thiaxanthenecarboxylate in 600 ml. of dry toluene. The mixture is stirred at 25° C. for two hours, then is refluxed for 15 minutes. To this mixture is added 45.0 g. of 2-butyl-3-chloro-1-dimethylaminopropane and the resulting mixture is refluxed for 24 hours. Working up as in Example 2 and treating the resulting intermediate with lithium aluminum hydride yields 10-(2′-butyl-3′-dimethylaminopropyl)-10-thiaxanthene methanol.

A mixture of 18.4 g. of 10-(2′-butyl-3′-dimethylaminopropyl)-10-thiaxanthene methanol, 9.5 g. of p-toluenesulfonyl chloride and 45 ml. of dry pyridine is kept at room temperature for 48 hours. Working up as in Example 1 and passing the resulting quaternary ammonium p-toluenesulfonate through an ion exchange resin gives 5 - butyl - 1,1 - dimethyl-spiro[piperidinium - 3,10′ - thiaxanthene]-chloride.

Heating this chloride salt at 0.25–0.5 mm. and distilling the product gives 5-butyl-1-methyl-spiro-[piperidine-3,10′-thiaxanthene].

Treatment of 0.5 g. of the free base in 50 ml. of ether with excess ethanolic hydrogen chloride gives the hydrochloride salt.

Example 16

Condensing 1-bromo-3-chloropropane with diallylamine in benzene with sodium carbonate gives 1-diallylamino-3-chloropropane which is condensed with ethyl 10-thiaxanthenecarboxylate. The resulting intermediate is reduced with lithium aluminum hydride to give 10-(3′-diallylaminopropyl)-10-thiaxanthene methanol.

A mixture of 20.8 g. of 10-(3′-diallylaminopropyl)-10-thiaxanthene methanol, 9.5 g. of p-toluene-sulfonyl chloride and 45 ml. of dry pyridine is allowed to stand at 25° C. for 36 hours. Working up as in Example 1, refluxing the intermediate ester in methyl ethyl ketone and then passing an alcoholic solution of the resulting p-toluenesulfonate salt through a chloride exchange resin gives 1,1 - diallyl - spiro[piperidinium-3,10′-thiaxanthene]chloride. Heating this quaternary salt at 0.3–0.5 mm. and distilling gives 1 - allyl-spiro-[piperidinium-3,10′-thiaxanthene].

Example 17

To a solution of 5.1 g. of cyanogen bromide in 50 ml. of ether is added 28.1 g. of 1-allyl-spiro-[piperidine-3,10′-thiaxanthene], prepared as in Example 16, under cooling. The mixture is diluted with 50 ml. of ether, then heated on a steam bath for one hour. Filtering and distilling gives 1-cyano-spiro[piperidine-3,10′-thiaxanthene].

Refluxing the above prepared cyano compound with hydrochloric acid in aqueous ethanol for six hours, then neutralizing with sodium carbonate, extracting with ether and evaporating the ether from the extract gives spiro-[piperidine-3,10′-thiaxanthene].

A mixture of 13.3 g. of spiro[piperidine-3-10′-thiaxanthene], 6.8 g. of butyl bromide, 12.5 of sodium carbonate and 100 ml. of toluene is heated at reflux for eight hours.

The cooled reaction mixture is poured into water and the organic layer is separated. Removal of the toluene and distillation of the residue gives 1-butyl-spiro[piperidine-3,10'-thiaxanthene].

*Example 18*

Condensation of ethyl 9-xanthenecarboxylate with 1-chloro-2-diallylaminoethane and reduction of the resulting intermediate with lithium aluminum hydride gives 9-(2'-diallylaminoethyl)-9-xanthene methanol.

A mixture of 16.8 g. of 9-(2'-diallylaminoethyl)-9-xanthene methanol, 9.5 g. of p-toluenesulfonyl chloride and 40 ml. of dry pyridine is kept at 25° C. for 48 hours. Working up as in Example 1 and refluxing the resulting intermediate ester in methyl ethyl ketone gives 1,1-diallyl-spiro[pyrrolidinium - 3,9' - xanthene]p-toluenesulfonate which is converted to the corresponding chloride salt by passing through a chloride exchange column.

Heating 1,1-diallyl-spiro[pyrrolidinium-3,9'-xanthene]-chloride at 0.4–0.5 mm. and distilling gives 1-allyl-spiro-[pyrrolidine-3,9'-xanthene].

*Example 19*

Substituting 26.5 g. of 1-allyl-spiro[pyrrolidine-3,9'-xanthene], prepared as in Example 18, for the corresponding piperidine-3,10'-thiaxanthene compound in the reaction procedure of Example 17 gives spiro[pyrrolidine-3,9'-xanthene].

A mixture of 2.0 g. of spiro[pyrrolidine-3,9'-xanthene] and 50 ml. of acetic anhydride is refluxed for three hours. Concentration in vacuo gives 1-acetyl-spiro[pyrrolidine-3,9'-xanthene].

A solution of 1.5 g. of 1-acetyl-spiro[pyrrolidine-3,9'-xanthene] in dry ether is added to 1.0 g. of lithium aluminum hydride in dry ether. The mixture is refluxed for 12 hours, then is treated with 10 ml. of water and filtered. The filtrate is extracted with dilute hydrochloric acid. The extracts are neutralized and extracted with ether. Removal of the ether from the extracts and distillation of the residue gives 1-ethyl-spiro[pyrrolidine-3,9'-xanthene].

*Example 20*

A mixture of 13.3 g. of spiro[piperidine-3,10'-thiaxanthene], prepared as in Example 16, 4.5 g. of 1-chloro-2-butene, 12.5 g. of sodium carbonate and 100 ml. of toluene is heated at reflux for eight hours. Working up as in Example 17 gives 1-(2-butenyl)-spiro[piperidine-3,10'-thiaxanthene].

The free base in ether is treated with ethanolic hydrogen chloride to give, upon dilution with ether, the hydrochloride salt.

What is claimed is:

1. A chemical compound of the class consisting of a free base, its nontoxic, pharmaceutically acceptable acid addition salts and its nontoxic, pharmaceutically acceptable quaternary ammonium halide, p-toluene sulfonate, benzene sulfonate and lower alkyl sulfonate salts, the free base having the structural formula:

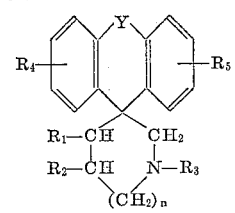

in which Y is a member selected from the group consisting of sulfur and oxygen, $R_1$ and $R_2$ are members selected from the group consisting of hydrogen and lower alkyl, $R_3$ is a member selected from the group consisting of hydrogen, lower alkyl, and lower alkenyl; $R_4$ and $R_5$ are members selected from the group consisting of hydrogen, halogen having an atomic weight of less than 80, trifluoromethyl, lower alkyl, lower alkoxy and lower alkylthio; and $n$ is an integer selected from the group consisting of 0 and 1.

2. A chemical compound having the formula:

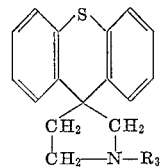

in which $R_3$ is lower alkyl.

3. A chemical compound having the formula:

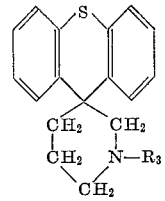

in which $R_3$ is lower alkyl.

4. A chemical compound having the formula:

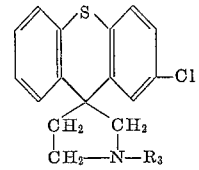

in which $R_3$ is lower alkyl.

5. 1-methyl-spiro[pyrrolidine-3,10'-thiaxanthene].
6. 1,1-bimethyl-spiro[pyrrolidinium - 3,10' - thiaxanthene]chloride.
7. 1-methyl-spiro[piperidine-3,10'-thiaxanthene].
8. 1,1-bimethyl-spiro[piperidinium-3,10'-thiaxanthene]-chloride.
9. 2' - chloro-1-methyl-spiro[piperidine-3,10'-thiaxanthene].

No references cited.